(12) United States Patent
Guedalia

(10) Patent No.: US 6,745,226 B1
(45) Date of Patent: Jun. 1, 2004

(54) METHOD AND SYSTEM FOR PROGRESSIVE ENCODING IN AN ACTIVE DESKTOP ENVIRONMENT

(75) Inventor: Jacob Leon Guedalia, Jerusalem (IL)

(73) Assignee: Roxio, Inc., Santa Clara, CA (US)

( * ) Notice: Subject to any disclaimer, the term of this patent is extended or adjusted under 35 U.S.C. 154(b) by 0 days.

(21) Appl. No.: 08/850,787

(22) Filed: May 2, 1997

(51) Int. Cl.[7] .............................................. G06F 13/00
(52) U.S. Cl. ...................... 709/203; 709/217; 709/247
(58) Field of Search ............................... 709/200, 201, 709/203, 206, 208, 212, 213, 217, 218, 219, 247; 345/121, 334, 526, 525, 511; 348/12, 13, 14, 17

(56) References Cited

U.S. PATENT DOCUMENTS

| | | | | |
|---|---|---|---|---|
| 5,434,678 A | * | 7/1995 | Abecassis | 358/342 |
| 5,485,611 A | * | 1/1996 | Astle | 395/600 |
| 5,606,359 A | * | 2/1997 | Youden et al. | 348/7 |
| 5,621,429 A | * | 4/1997 | Yamaashi et al. | 345/119 |
| 5,699,458 A | * | 12/1997 | Sprague | 382/250 |
| 5,758,181 A | * | 5/1998 | Becker | 395/821 |
| 5,832,300 A | * | 11/1998 | Lowthert | 395/853 |
| 5,861,920 A | * | 1/1999 | Mead et al. | 348/390 |
| 5,870,553 A | * | 2/1999 | Shaw et al. | 709/249 |
| 5,880,728 A | * | 3/1999 | Yamaashi et al. | 345/343 |
| 5,886,733 A | * | 3/1999 | Zdepski et al. | 348/13 |
| 5,949,551 A | * | 9/1999 | Miller | 358/408 |
| 6,038,257 A | * | 3/2000 | Brusewitz et al. | 375/240 |
| 6,185,625 B1 | * | 2/2001 | Tso et al. | 709/247 |

* cited by examiner

Primary Examiner—Moustafa M. Meky
(74) Attorney, Agent, or Firm—Martine & Penilla, LLP

(57) ABSTRACT

A system for transmitting digital data to an active desktop of a user with push pull functionality, the system comprising a digital data transmitter operative to transmit the digital data to the active desktop in blocks which are sequentially transmitted to the active desktop, each block being an incomplete collection of data and being viewable even when less than all of the blocks have been received, receipt of subsequent blocks by the receiver serving to cumulatively improve the quality of the digital data received by the receiver, at least one but not all of the blocks being transmitted to the active desktop in a push manner, and at least one of the remaining blocks being transmitted to the active desktop in a pull manner, when specifically actuated by the user. A method is also described and claimed.

31 Claims, 15 Drawing Sheets

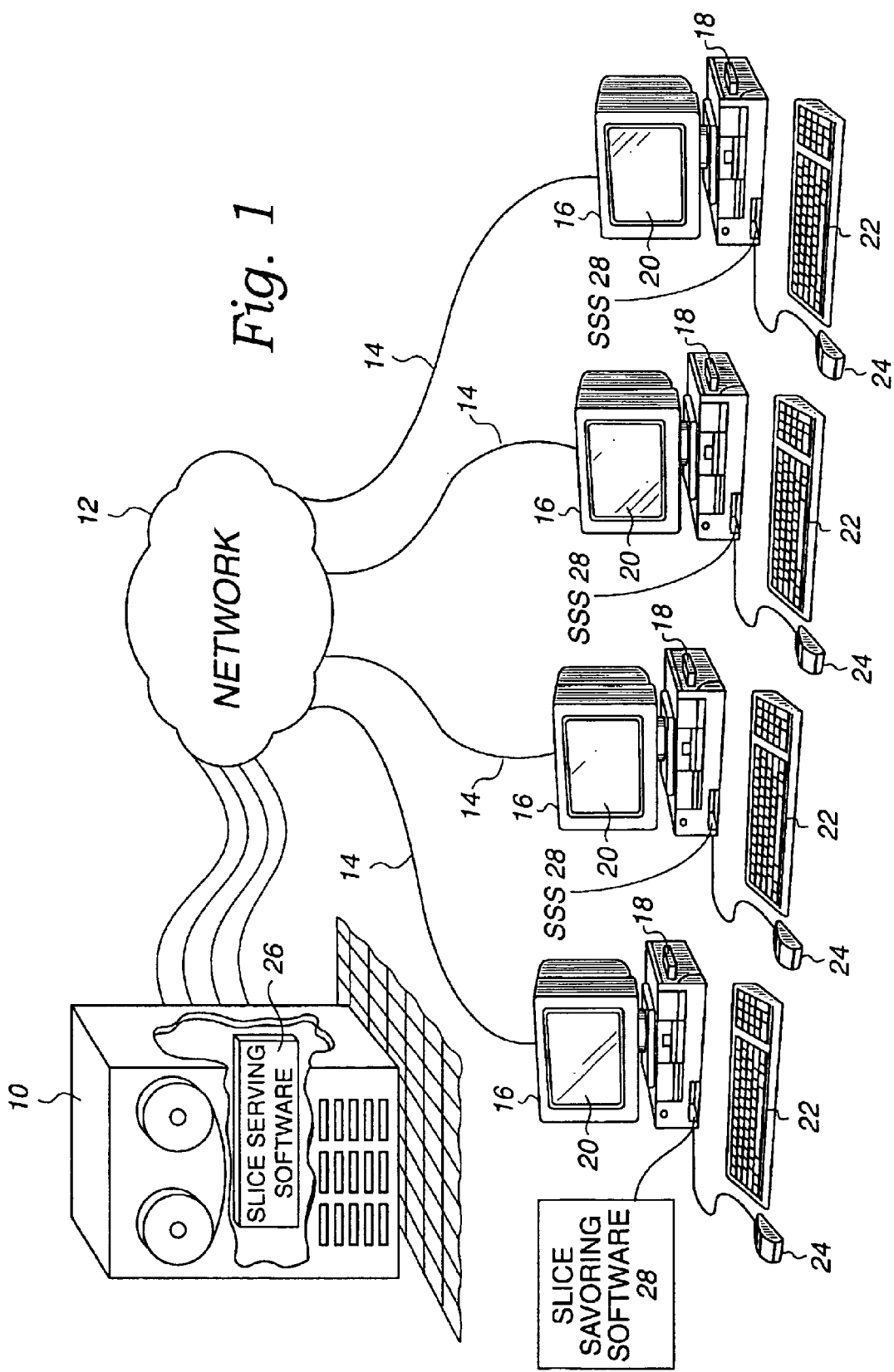

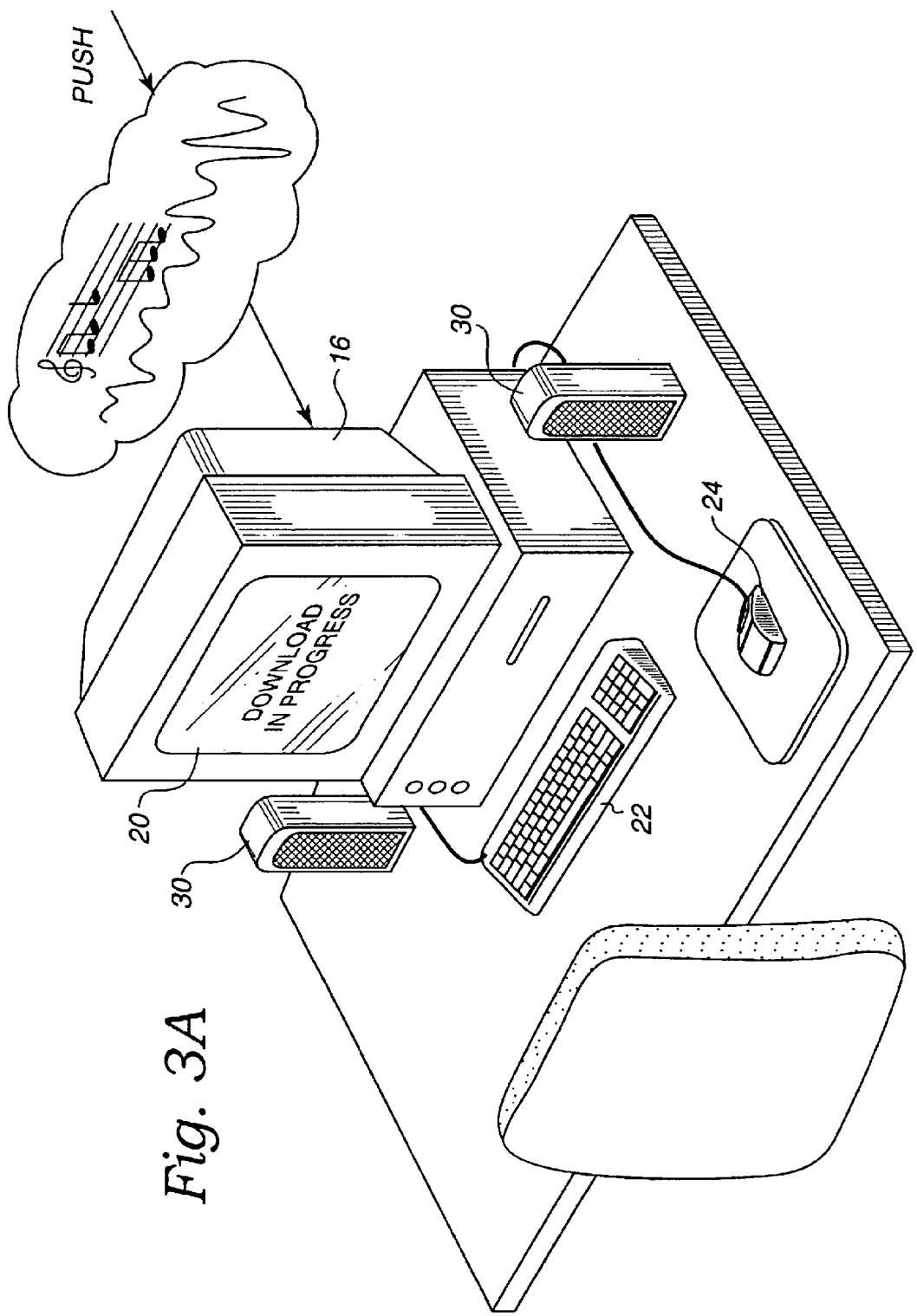

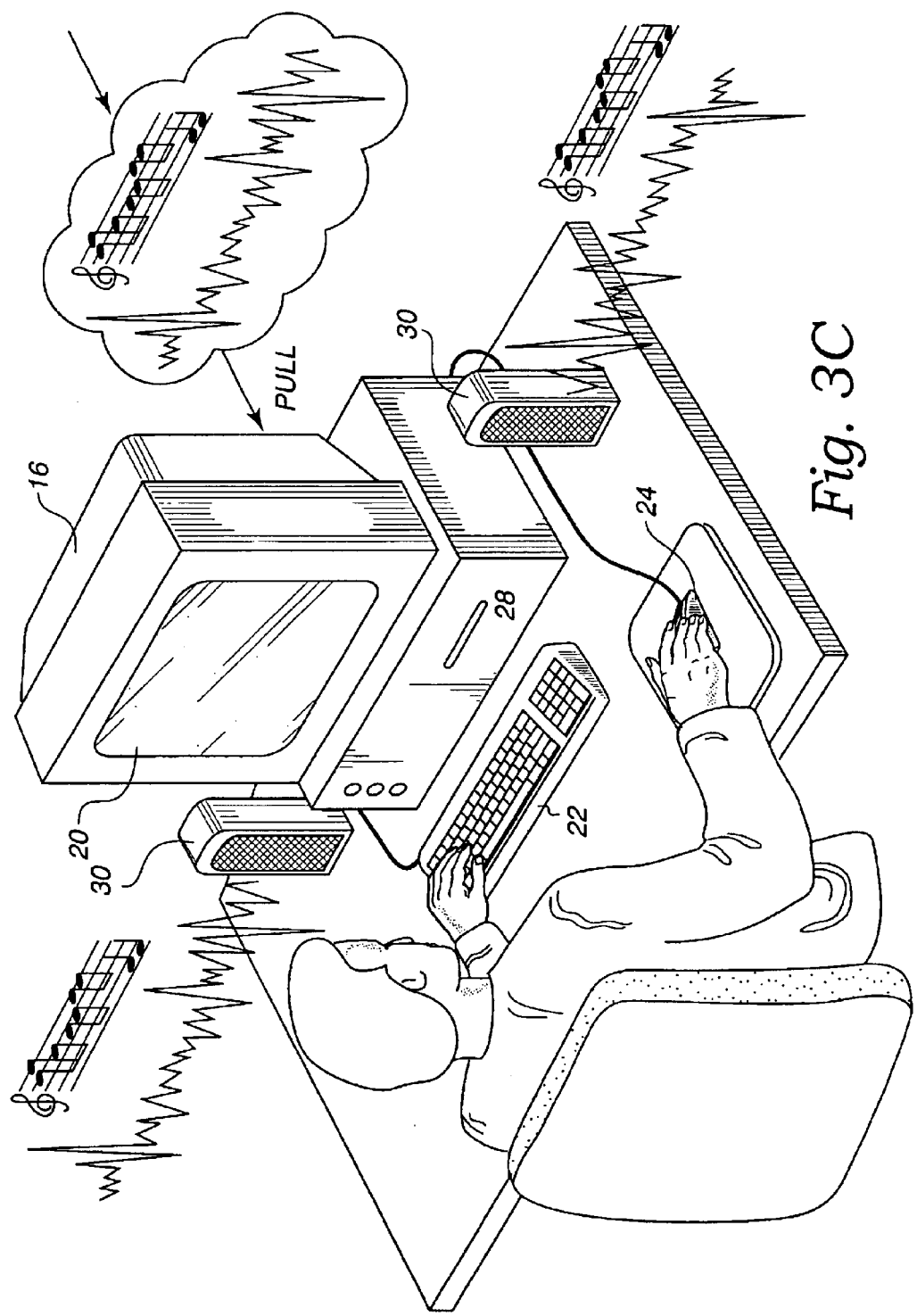

METHOD AND SYSTEM FOR PROGRESSIVE ENCODING IN AN ACTIVE DESKTOP ENVIRONMENT

FIELD OF THE INVENTION

The present invention relates to active networks generally and more particularly to push-pull functionalities and applications.

BACKGROUND OF THE INVENTION

The degree to which the Internet facilitates people's efforts in accomplishing their goals depends on how successful is their access to the wealth of information which is available. Internet browsers, such as Netscape or Internet Explorer, together with search engines such as those of Infoseek, Lycos, Yahoo or many other companies, enable the user to find his way through the complex manifold of universal resource locators (URL's) which are all interconnected. On account of the tremendous number of web sites, and the volume of information stored at a typical site, searches typically involve a great deal of time—especially for the novice. Download speed is one factor contributing to the overall time required to conclude a search, but another factor is the difficulty of navigating through the maze of sites and linking from site to site.

Push-pull functionalities are currently gaining acceptance in computer network environments to facilitate searching and reduce the time requirements thereof The upcoming version of Microsoft WINDOWS® ("Windows 97", code named Memphis) includes an Active Desktop based on Microsoft ActiveX technology, and allows content developers and publishers to implement "push" technology.

Currently users pull information from the Internet with a web browser by selecting the specific web pages they want to view, and rely on the browser to pull the information from a server onto the user's desktop. This places full control over what information is being viewed in the hands of the user. Internet companies, such as PointCast and Marimba, are pioneering a new system based on push technology, in which a content developer or publisher decides what information a user will see and pushes that information from the server onto the user's desktop without the need for the user to specifically make a request.

The "active desktop" concept provides the user, without his undertaking a search, with pre-selected material in accordance with pre-selected user indicated preferences. The general idea is that search material is supplied to the user's computer in background, without the user's direct involvement. The user's preferences guide selection of such material. The results of this selection are placed on the user's desktop; hence, the names "push" to indicate the absence of direct user interactivity, and "active desktop" for the feature which dynamically updates the user's desktop with the relevant material. In distinction to "pushing", the classical mode whereby the user actively guides the search and directly navigates and chooses what material to download, is called "pulling".

The amount of material which can be made available to the user in the context of an "active desktop" is limited in practice by the storage capacity of the user's computer. Even with the help of data compression, it is to be expected that the user's active desktop cannot hold all of the material which is relevant to his search preferences. Some forms of content require only very modest amounts of storage. URL information and text-only hyper-text markup language (HTML) material, for example, occupy very little memory, and can be retrieved in bulk quantities—especially if the text is in summary form. However, when dealing with material containing graphics or multi-media content, the storage requirements are substantially greater and, as a result, the capacity for retrieval is more restricted.

Some form of compromise has to be made, either (1) by prioritizing what gets stored in the desktop, and using the prioritization to filter out whatever does not fit within the allotted space, or (2) by limiting the size of each object which is stored in the desktop, and throwing away parts of full files which exceed this size.

Data streaming over the Internet is known for transmitting image data progressively to a user in accordance with the available bandwidth along a data link leading to the user. Whereas streaming does overcome bandwidth limitations, it does not address issues of limitations on data storage capacity at a user's site.

SUMMARY OF THE INVENTION

The present invention seeks to provide a method, system and devices for progressive encoding of digital data in an active desktop environment.

There is thus provided in accordance with a preferred embodiment of the present invention a system for transmitting digital data to an active desktop of a user with push pull functionality, the system comprising a digital data transmitter operative to transmit the digital data to the active desktop in blocks which are sequentially transmitted to the active desktop, each block being an incomplete collection of data and being viewable even when less than all of the blocks have been received, receipt of subsequent blocks by the receiver serving to cumulatively improve the quality of the digital data received by the receiver, at least one but not all of the blocks being transmitted to the active desktop in a push manner, and at least one of the remaining blocks being transmitted to the active desktop in a pull manner, when specifically actuated by the user.

There is also provided in accordance with a preferred embodiment of the present invention a system for transmitting digital data to an active desktop of a user with push pull functionality, the system comprising a digital data downloader operative to transmit a first portion of the digital data to the active desktop in a push mode, the first portion of the data being such as to enable all of the data to be accessible at at least a minimum quality prior to transmittal of all of the digital data to the active desktop, the digital downloader also being operative in a pull mode in response to user actuation for transmitting a second portion of the data, which when combined at the active desktop with the first portion, provides the user with the digital data at an enhanced quality as compared with the minimum quality.

There is also provided in accordance with a preferred embodiment of the present invention a system for transmitting digital data to an active desktop of a user with push functionality, the system comprising a digital data downloader operative to transmit a portion of a digital data file to the active desktop in a push mode, the portion of the data being such as to enable all of the digital data file to be accessible to the user at at least a minimum quality prior to transmittal of the remainder of the digital data file to the active desktop.

Further in accordance with a preferred embodiment of the present invention the digital data file is an image file and the portion of the data enables the entire image to be seen by a user at at least a minimum quality.

Still further in accordance with a preferred embodiment of the present invention the digital data file is an audio file and the portion of said data enables the entire audio file to be heard by a user at at least a minimum quality.

Moreover in accordance with a preferred embodiment of the present invention the digital data downloader is operative to transmit the portion of the digital data to the active desktop in response to receipt of a signal from the active desktop when the signal is generated without concurrent user actuation.

Additionally in accordance with a preferred embodiment of the present invention the digital data downloader is operative to transmit the portion of the digital data to the active desktop in response to an actuation input generated at the digital data downloader.

Preferably the digital data downloader is located at a server and is operative to transmit the portion of the digital data to the active desktop in response to an actuation input generated at the server.

The digital downloader may be operative when the active desktop is either on-line or off-line.

There is also provided in accordance with a preferred embodiment of the present invention a system for transmitting digital data to an active desktop of a user with pull functionality, following transmission of a first portion of digital data to the active desktop with a push functionality, thus providing a user with the digital data at at least a minimum quality, the system comprising a digital data downloader operative in a pull mode in response to user actuation for transmitting a second portion of the data, which when combined at the active desktop with the first portion, provides the user with the digital data at an enhanced quality as compared with the minimum quality.

There is also provided in accordance with a preferred embodiment of the present invention a method for transmitting digital data to an active desktop of a user with push pull functionality, the method comprising transmitting the digital data to the active desktop in blocks which are sequentially transmitted to the active desktop, each block being an incomplete collection of data and being viewable even when less than all of the blocks have been received, receipt of subsequent blocks by the receiver serving to cumulatively improve the quality of the digital data received by the receiver, at least one but not all of said blocks being transmitted to the active desktop in a push manner, and at least one of the remaining blocks being transmitted to the active desktop in a pull manner, when specifically actuated by the user.

There is also provided in accordance with a preferred embodiment of the present invention a method for transmitting digital data to an active desktop of a client computer with push pull functionality, comprising pushing a first portion of the digital data to the active desktop, the first portion of the data being such as to enable all of the data to be accessible at at least a minimum quality prior to transmittal of all of the digital data to said active desktop, pulling, in response to user actuation, a second portion of the data, and combining at the client computer the first portion and the second portion, thereby to provide the user with the digital data at an enhanced quality as compared with the minimum quality.

There is also provided in accordance with a preferred embodiment of the present invention a method for transmitting digital data to an active desktop of a client computer with push functionality, the method comprising pushing a portion of a digital data file to the active desktop, the portion of the data being such as to enable all of the digital data file to be accessible to the user at at least a minimum quality prior to transmittal of the remainder of the digital data file to the active desktop.

Further in accordance with a preferred embodiment of the present invention the digital data file is an image file and the portion of the data enables the entire image to be seen by a user at at least a minimum quality.

Still further in accordance with a preferred embodiment of the present invention the digital data file is an audio file and the portion of the data enables the entire audio file to be heard by a user at at least a minimum quality.

Moreover in accordance with a preferred embodiment of the present invention the digital data downloader is operative to transmit the portion of the digital data to the active desktop in response to receipt of a signal from the active desktop when the signal is generated without concurrent user actuation.

Additionally in accordance with a preferred embodiment of the present invention the pushing step transmits the portion of the digital data to the active desktop in response to an actuation input generated at the location where the pulling occurs stored.

Further in accordance with a preferred embodiment of the present invention the pushing step transmits the portion of the digital data to the active desktop in response to an actuation input generated at the server.

There is also provided in accordance with a preferred embodiment of the present invention a method for transmitting digital data to an active desktop of a user with pull functionality, following transmission of a first portion of digital data to the active desktop with a push functionality, thus providing a user with the digital data at at least a minimum quality, the method comprising pulling in response to user actuation at least a second portion of the data, and combining at the active desktop the second portion with the first portion, thereby providing the user with the digital data at an enhanced quality as compared with the minimum quality.

There is also provided in accordance with a preferred embodiment of the present invention a method for receiving digital data at an active desktop of a client computer having push pull functionality comprising receiving a first portion of the digital data transmitted in a push mode to the active desktop, the first portion of the data being such as to enable all of the data to be accessible at at least a minimum quality prior to transmittal of all of the digital data to the active desktop, pulling, in response to user actuation, a second portion of the data, and combining at the client computer the first portion and the second portion, thereby providing the user with the digital data at an enhanced quality as compared with the minimum quality.

There is also provided in accordance with a preferred embodiment of the present invention a system for receiving digital data at an active desktop of a client computer having push pull functionality comprising a pushed partial data receiver, receiving a first portion of the digital data transmitted in a push mode to the active desktop, the first portion of the data being such as to enable all of the data to be accessible at at least a minimum quality prior to transmittal of all of the digital data to the active desktop, a user actuated partial puller to pull, in response to user actuation, a second portion of the data, and a combiner, combining at the client computer the first portion and the second portion, thereby providing the user with the digital data at an enhanced quality as compared with the minimum quality.

The pushing step may take place when the active desktop is on-line or off-line.

The term "quality" as used throughout the specification and claims is understood as referring to the degree to which a rendered version of an original is faithful to the original. Specifically, when dealing with images, quality refers to the degree to which the displayed image is faithful to the original image or scene. Normally this is expressed as the degree to which the approximation of pixel values in the displayed image approaches the correct pixel values in the original image or scene. Specifically, when dealing with audio, quality refers to the degree to which a played sound is faithful to the original sound.

BRIEF DESCRIPTION OF THE DRAWINGS

The present invention will be understood and appreciated more fully from the following detailed description, taken in conjunction with the drawings in which:

FIG. 1 is a simplified illustration of a system for transmitting digital image data with push and pull functionality;

FIGS. 3A, 3B and 3C are simplified illustrations of functionality for transmitting digital audio data in respective push, hear and pull modes of operation;

DETAILED DESCRIPTION OF PREFERRED EMBODIMENTS

Figure 2A:
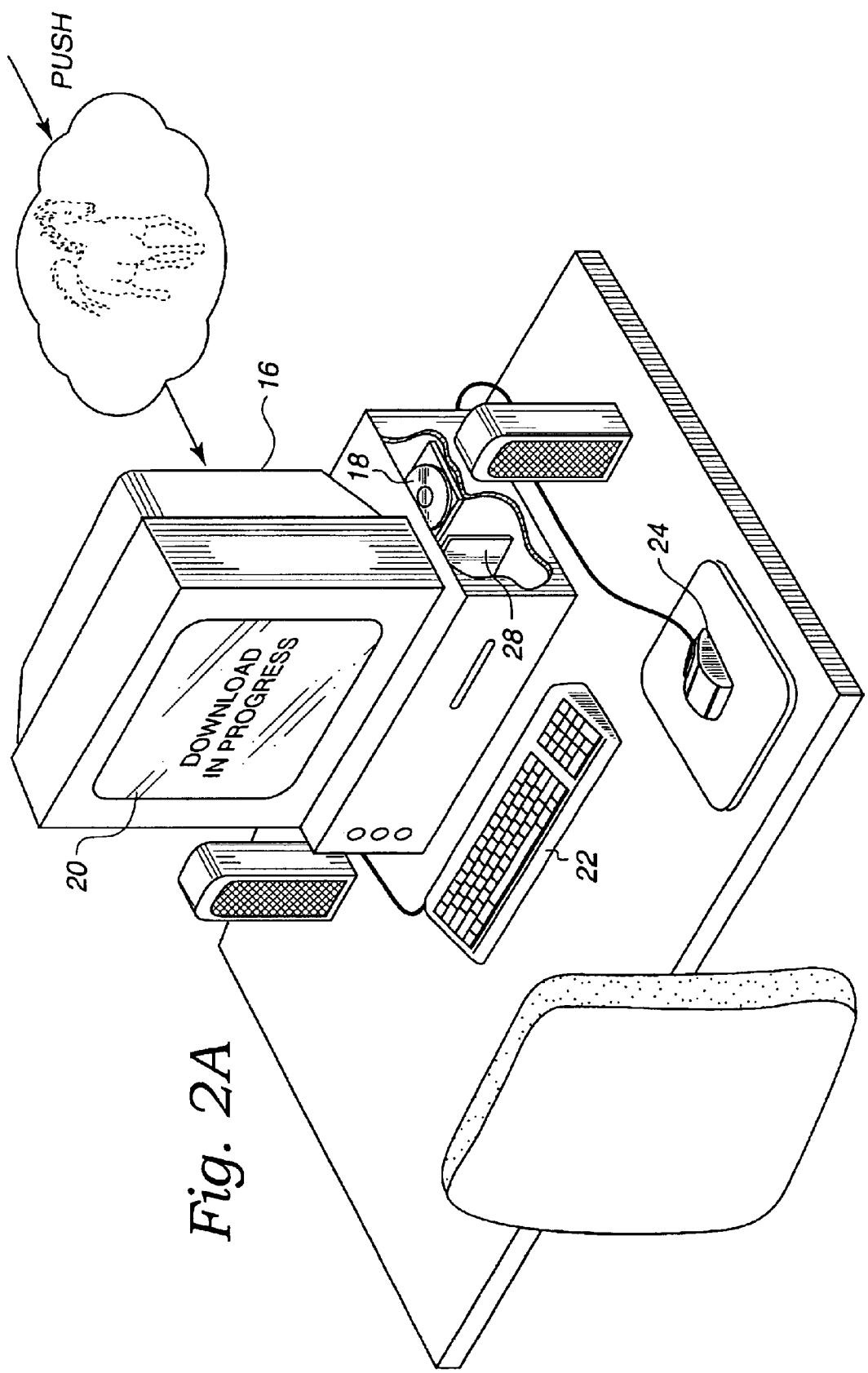
FIGS. 2A, 2B and 2C are simplified illustrations of functionality for transmitting digital image data in accordance with a preferred embodiment of the present invention in respective push, view and pull modes of operation.

Reference is now made to FIG. 1 which is a simplified illustration of a system for transmitting digital image data with push and pull functionality in accordance with a preferred embodiment of the present invention. The hardware portions of the system include a server 10, a communications network 12 providing a multiplicity of communication lines 14 and a multiplicity of client computers 16 which are each connectable to the server 10 via a communication line 14. Each client computer includes a memory 18, such as a hard disk, a display 20 and a user interface such as a keyboard 22 and a mouse 24.

In accordance with a preferred embodiment of the present invention push-pull slice serving software 26 is resident on the server and push-pull slice savoring software 28 is resident on the client computer 16. The slice serving software 26 and the slice savoring software 28 cooperate to provide client computer memory conserving push-pull functionality in accordance with a preferred embodiment of the present invention in which an active desktop is provided at the client computer.

As will be described hereinbelow in greater detail, the present invention provides digital data downloading by the server which transmits a first portion, or slice, of the digital data to the active desktop in a push mode, the first portion of the data being such as to enable all of the data to be accessible at at least a minimum quality prior to transmittal of all of the digital data to the active desktop.

The server is also operative in a pull mode in response to user actuation for transmitting a second portion of the data, which when combined at the active desktop with the first portion, provides the user with the digital data at an enhanced quality as compared with the minimum quality. The digital data may be any suitable data.

Figure 2B:
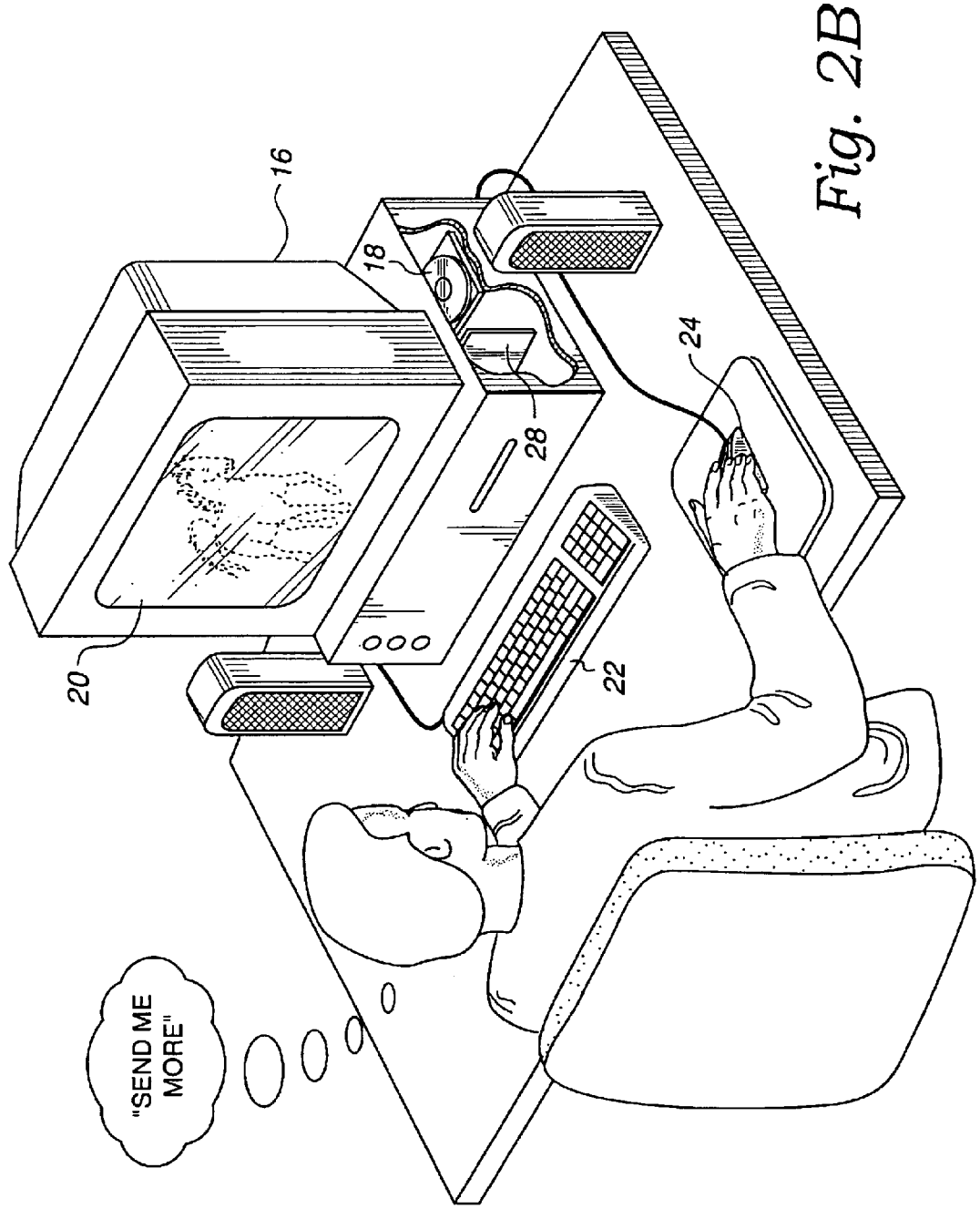
Figure 2C:
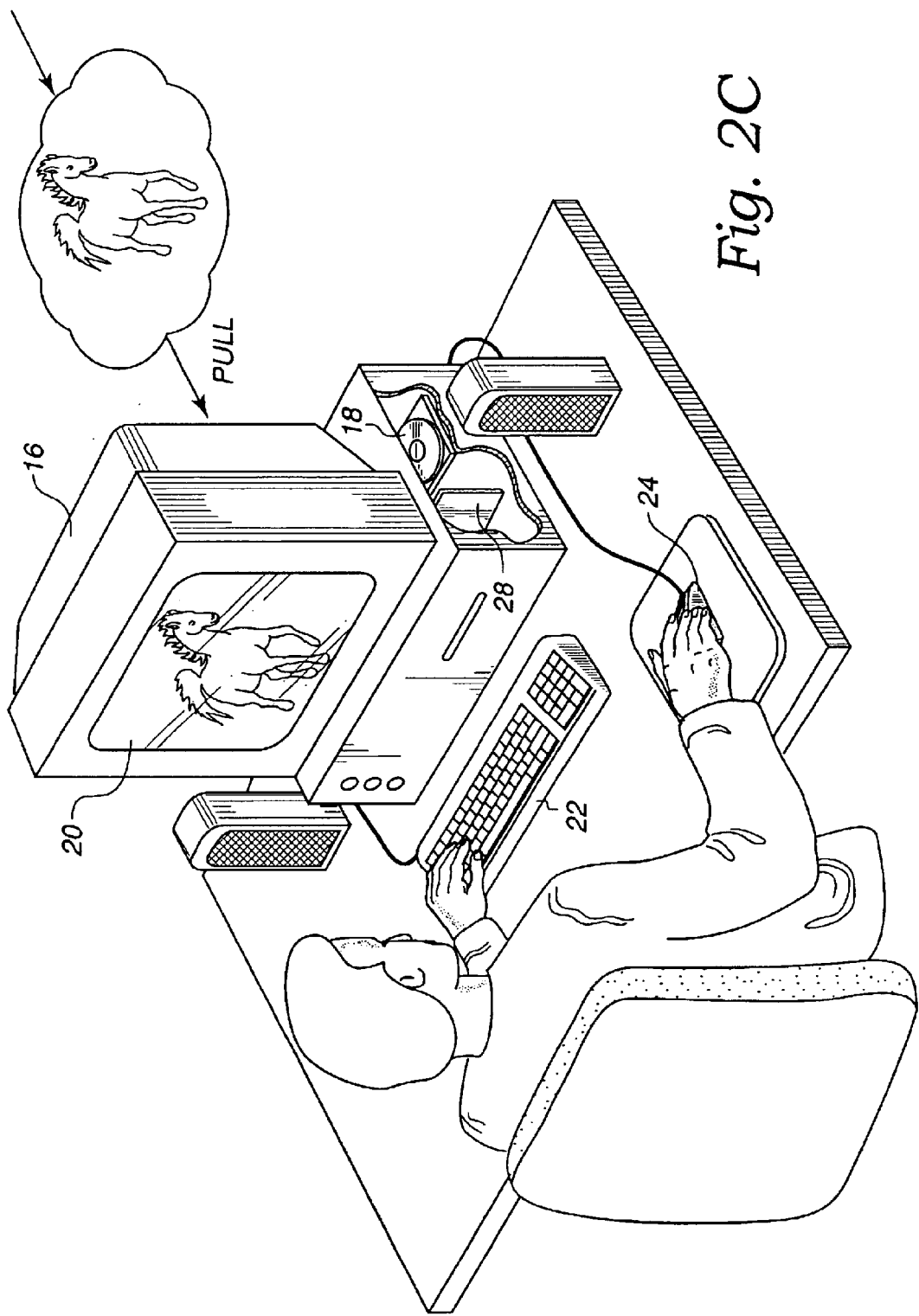

FIGS. 2A–2C illustrate the invention when used for transmitting image data. Thus it is seen that during operation in a push mode, illustrated in FIG. 2A, a first slice of digital image data is provided to the client computer, representing a relatively low quality image, which is stored in the client computer memory 18 and takes up relatively small amounts of memory as compared with a full quality image. The push mode may take place with or without user presence and whether or not the active desktop of the user is on-line. When the active desktop is off-line, the push functionality may use E-mail.

Upon user access to the pushed data stored in the memory for viewing thereof, as illustrated in FIG. 2B, the low quality image is made available to the user on the display 20, by means of the slice savoring software 28, to enable the user to decide whether he wishes to receive the full quality image. If the user does wish to receive the full quality image, he actuates a pull functionality using slice savoring software 28, which causes the remaining slices to be downloaded from the server 10 and to be combined with the earlier received slices at the client computer 16. Upon receipt of some or all of the remaining slices, an enhanced or full quality image is displayed on display 20, as seen in FIG. 2C.

When the user is viewing the pushed image while on-line, the system may alternatively operate so as to send all of the slices to the user, as quickly as permitted by the available bandwidth, and without waiting for a specific user request. Thus it may be appreciated that user actuation of the pull functionality may take place merely by user viewing of an image while the active desktop is on-line.

Figure 3B:
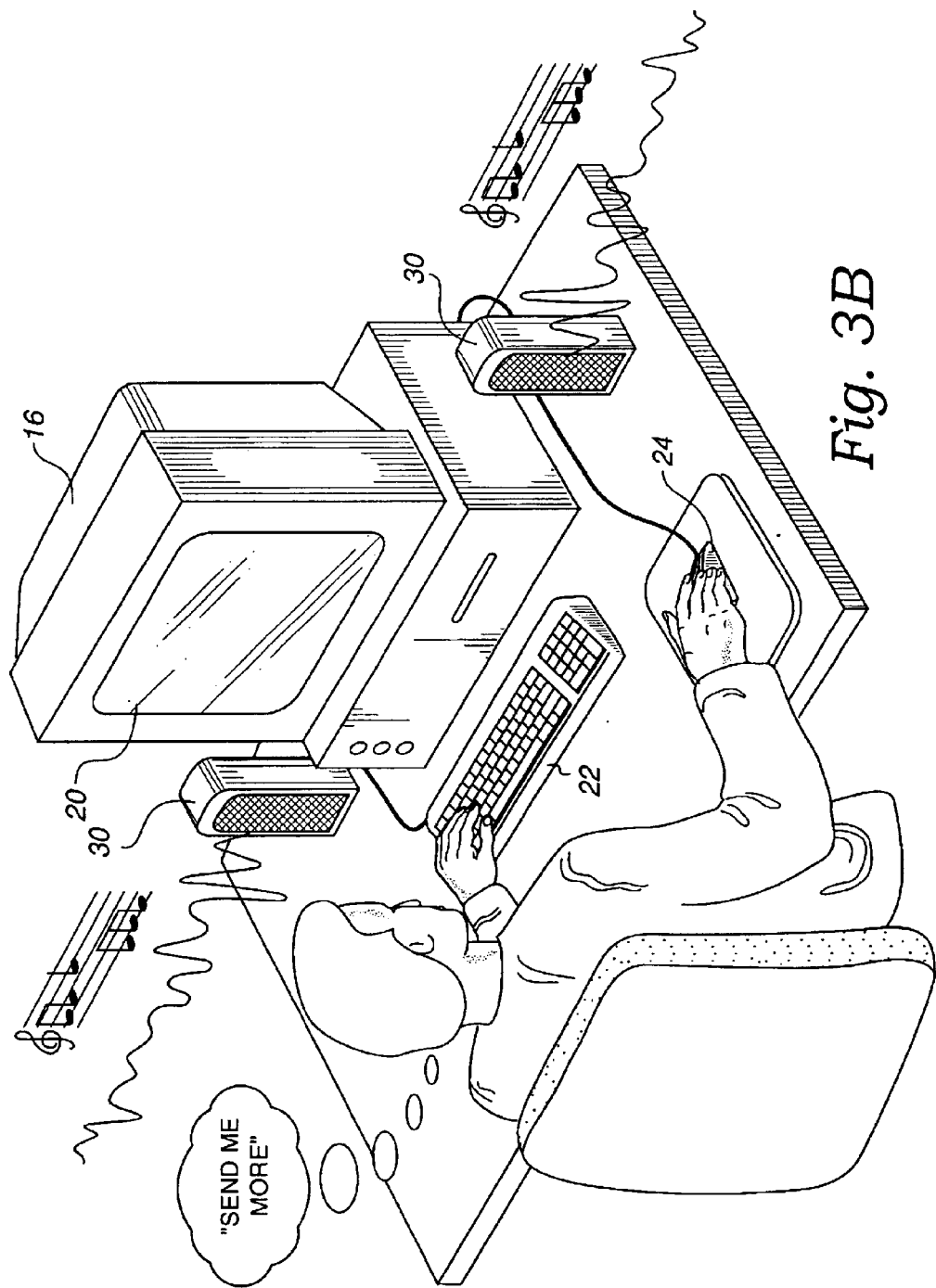

Reference is now made to FIGS. 3A, 3B and 3C, which are simplified illustrations of a system and method for transmitting digital audio data in respective push, hearing and pull modes of operation. It is seen that during operation in a push mode, illustrated in FIG. 3A, a first slice of digital audio data is provided to the client computer, representing a relatively low quality audio file, which is stored in the client computer memory 18 and takes up relatively small amounts of memory as compared with a full quality audio file.

Upon user access to the pushed data stored in the memory for hearing thereof, as illustrated in FIG. 3B, the low quality audio file is played to the user by a speaker 30 using suitable audio output software, such as SOUNDBLASTER® and by means of the slice savoring software 28, to enable the user to decide whether he wishes to receive the full quality audio file. If the user does wish to receive the full quality audio file, he actuates a pull functionality using slice savoring software 28, which causes the remaining slices to be downloaded from the server 10 and to be combined with the earlier received slices at the client computer 16. Upon receipt of some or all of the remaining slices, an enhanced or full quality audio file is played for the user as illustrated in FIG. 3C.

When the user is listening to the pushed audio file while on-line, the system may alternatively operate so as to send all of the slices to the user, as quickly as permitted by the available bandwidth, and without waiting for a specific user request. Thus it may be appreciated that user actuation of the pull functionality may take place merely by user listening to an audio file while the active desktop is on-line.

Figure 4:
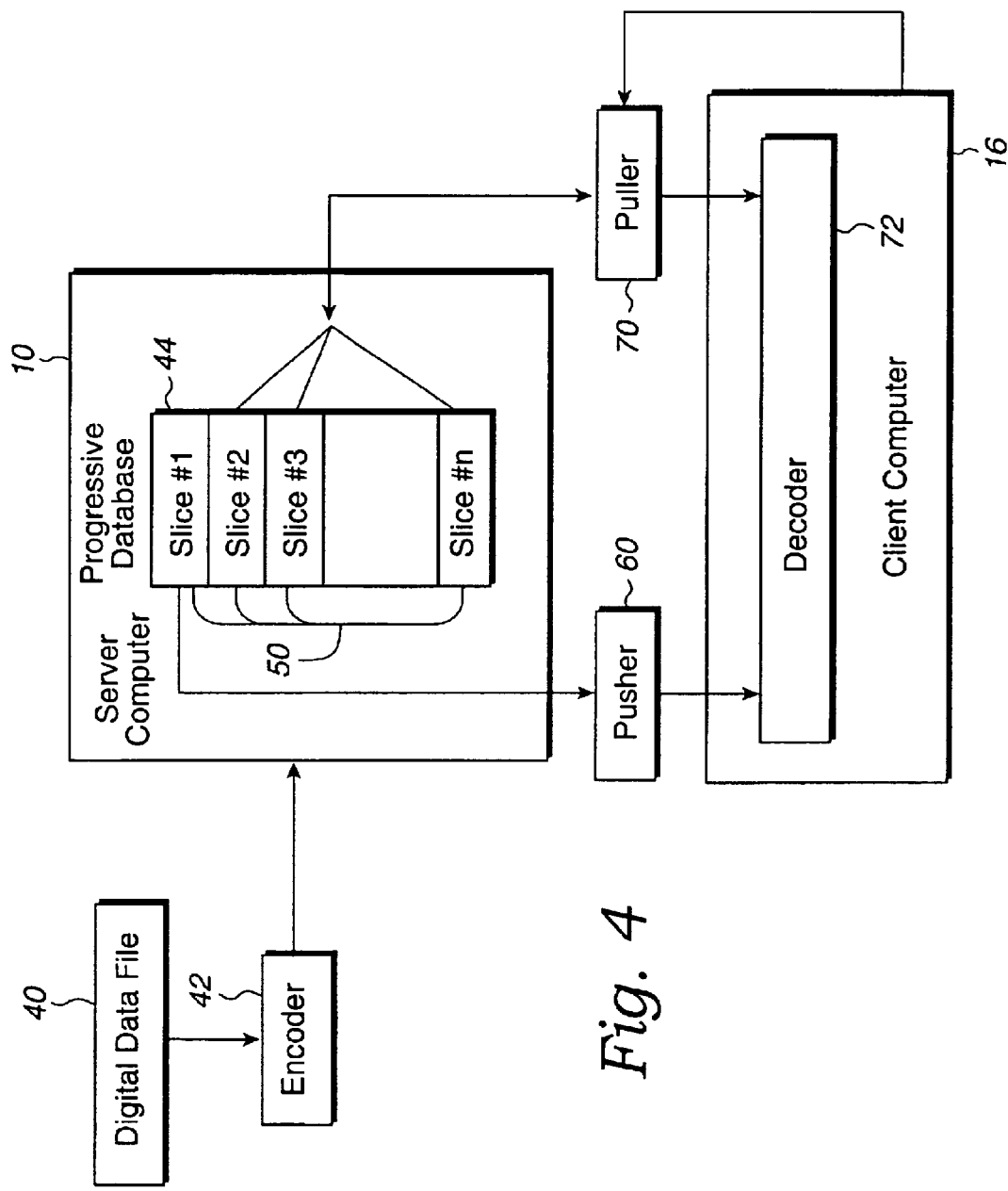
FIG. 4 is a simplified functional block diagram of a system for transmitting digital data constructed and operative in accordance with a preferred embodiment of the present invention.

Reference is now made to FIG. 4, which is a simplified and generalized functional block diagram of a system for transmitting digital data constructed and operative in accordance with a preferred embodiment of the present invention. A digital data file, such as, for example, a multimedia file 40 or alternatively an image file or an audio file, is divided into slices using an encoder 42 in an off-line function which is normally carried out by a content provider. The technique for dividing the digital data into slices is described and claimed in applicant/assignee's copending U.S. patent application Ser. No. 08/788,830, filed Jan. 6, 1997 and entitled METHOD AND SYSTEMS FOR SCALABLE REPRESENTATION OF MULTIMEDIA DATA FOR PROGRESSIVE ASYNCHRONOUS TRANSMISSION, the disclosure of which is hereby incorporated by reference, and now U.S. Pat. No. 6,536,043.

The sliced digital data is stored in a progressive database 44 in the server 10 in the form of a plurality of slices 50 and is downloaded to a client computer 16 via communications network 12 (FIG. 1A) in a manner determined by the operation of the slice serving software 26 (FIG. 1A) and the slice savoring software 28 (FIG. 1A) so as to provide client computer memory conserving push-pull functionality. The slice serving software 26 and the slice savoring software 28 cooperate to provide a pusher 60 and a puller 70, which are operative to provide respective push and pull functionalities.

Transmittal of sequential slices of the sliced digital data at the server and combining of the slices at the client computer by a decoder 72 are described and claimed in applicant/assignee's aforesaid copending U.S. patent application Ser. No. 08/778,830, filed Jan. 6, 1997 and entitled METHOD AND SYSTEMS FOR SCALABLE REPRESENTATION OF MULTIMEDIA DATA FOR PROGRESSIVE ASYNCHRONOUS TRANSMISSION, and now U.S. Pat. No. 6,536,043.

It is appreciated that the system architecture of FIG. 4 is applicable to any suitable sliceable digital data, such as, for example, image data, audio data, video data and other multimedia data.

The push and pull functionalities will now be described in detail with reference to the flow charts and functional block diagrams of FIGS. 5–8.

Specifically, the above referenced U.S. Patent Application describes media data comprised of m frames $F_1, F_2, \ldots, F_m$. A frame can be, for example, an individual frame of a movie sequence, a piece of a panoramic view, an individual segment of an audio signal, or even a sub-sampled version of a large still image. It can also be a group of frames, such as for example, a group of inter-frames between key frames in a video segment, in a setting where an H.263 codec is being used. In broad terms, frames are units of interactivity. For example, in object movies where interactivity means frame advance, a frame unit is an individual still image, whereas in gazing applications where interactivity means zooming in and out, the frame units are multi-resolution tiles.

The media data is encoded into n data blocks $B_1, B_2, \ldots, B_n$ preferably of roughly equal size. Each encoded data block $B_j$ contains m compressed frame units $F_1^j, F_2^j, \ldots, F_m^j$. Thus it is appreciated that the database is arranged in two dimensions, corresponding to blocks and frames. The dimension used for blocks is for achieving progressiveness, and the dimension used for frames is for achieving interactivity. The frame data can be transmitted in a selective order, but the blocks must be transmitted in sequence, since they build cumulatively.

Data block $B_1$ is used to deliver the media at a lowest bandwidth, say $f_1$ Kbs; data blocks $B_1$ and $B_2$, when integrated together, are used to deliver the media at a higher bandwidth, $f_2=2f_1$ Kbs; and in general, for $1 \pounds k \pounds n$, data blocks $B_1, B_2, \ldots, B_k$ when integrated together, are used to deliver the media at bandwidth $f_k=kf_1$ Kbs. Each higher bandwidth version delivers a higher quality rendition of the media. In this way, the presentation can accommodate multiple users connecting to a network with different bandwidths. Moreover, a user connecting with bandwidth $f_1$ who has downloaded data block $B_1$ and played the media, can continue downloading block $B_2$ in background, since the bandwidth has been freed, and thereby achieve the same quality as bandwidth $f_2$ the next time the media is replayed.

Within each block the frames can be accessed randomly and delivered selectively, so that a user can vary the quality level among the frames. For example, a viewer who wants to gaze at frame #3 may instruct the database to send frame #3 data from the first ten blocks, but only one block of data for all of the other frames. The viewing selection is carried out interactively, through the use of keyboard presses and mouse clicks, as the media is being played. Whereas for some applications it may be more natural to transmit the entire blocks in sequence, for other applications it may be more effective to first deliver as much data as possible for specific frames at the expense of lowering the quality of other frames. The two dimensionality of the database, together with its interactive accessibility, gives the user complete control over the transmission sequence.

A producer can control the bandwidth parameters $f_k$, or equivalently, the qualities of the media version obtained by integrating blocks $B_1, B_2, \ldots, B_k$. In general, it is not necessary that the blocks be of equal size, nor that the frequencies $f_k$ be given by $kf_1$. The producer can also control the final quality of the highest bandwidth version, or equivalently, the total number, n, of data blocks.

Applications include, inter alia, scaleable audio and video transmission, video previewing, progressively rendered object movies and panoramas, and large still images, as described hereinafter in greater detail.

Scaleable audio transmission: Digital audio data can be progressively encoded into a scalable database for asynchronous transmission at different bandwidths. A client connected with a low bandwidth line can receive a low quality version of the audio, which can be played back on-line at the low bandwidth as the data streams in. After the audio is played, additional data blocks can continue to be received and integrated with the previous blocks, so that the audio is upgraded to higher quality for replay.

Scaleable video transmission: Similar to the description above for the audio transmission, digital video data can be encoded into a scalable database for asynchronous delivery and progressive quality upgrade.

Video previewing: When encoding digital video data into a scaleable database, the first data blocks can be used to generate a preview of the video, restricted to selected frames. The preview can be played back by the client almost immediately after the streaming begins. Moreover, additional data blocks received are integrated with the data blocks from the preview, to form full view versions of the video.

Object movies: Advertising agencies are using object movies to produce interactive 3-D virtual reality presentations of merchandise on the Internet. A user can rotate and zoom a 3-D object, and examine it from different viewing angles. Object movies can be progressively encoded so that the user can download and begin playing them almost immediately after the streaming begins. Initially the movie scales to a quality commensurate with the bandwidth of the user's network connection, but as data blocks are received and the user interacts with the movie, additional data blocks are delivered and integrated with the previous blocks, resulting in a higher and higher quality movie. Regardless of bandwidth, the user can begin playback and interaction almost immediately, and does not need to wait for the complete download, as the first version of the movie delivered scales itself to the native bandwidth. As playback continues additional data streams in the background and the movie version is upgraded to higher and higher quality.

Panoramas: Panoramas are very large images which the user cannot view in their entirety, but rather sees within a restricted viewing window. By panning in various directions, and zooming in and out, the user navigates through the panorama. The continuous change in viewing window gives the effect of movement within a scene. Similar to the description above for object movies, panoramas can be progressively encoded so that a user can download and begin navigating through them almost immediately after the streaming begins. Initially the panorama scales to the user's bandwidth, and after the first data blocks are received, additional data blocks are streamed in background while the panorama is playing, to provide higher and higher image quality.

Large still images: Although large high quality still images are not composed of frames in the conventional sense, frames can be small image tiles within the full image at different resolutions, the smaller tiles having higher resolutions than the larger ones. The locations of the tiles can be marked as hot spots. When a user clicks on a hot spot within a specific tile, the database delivers that tile at a higher resolution, giving the effect of a zoom in. Within the higher resolution tile there can be more hot spots, and the zooming can continue through the database.

As a simple example, the first frame within a data block may contain the full image sub-sampled by 4:1, for example, in each dimension. The next set of frames within the data block may contain (some subset of) the four quadrants of the full image sub-sampled by 2:1 in each dimension. The next set of frames within the data block may contain (some subset of) the sixteen quadrants within the above four quadrants at the original resolution. A user could see the 4:1 reduction of the original image (the first block), click on one of the quadrants and then see that quadrant at a 2:1 reduction (a frame from the second set), and click further on one of its quadrants and then see it at full scale (a frame from the third set).

Figure 9:
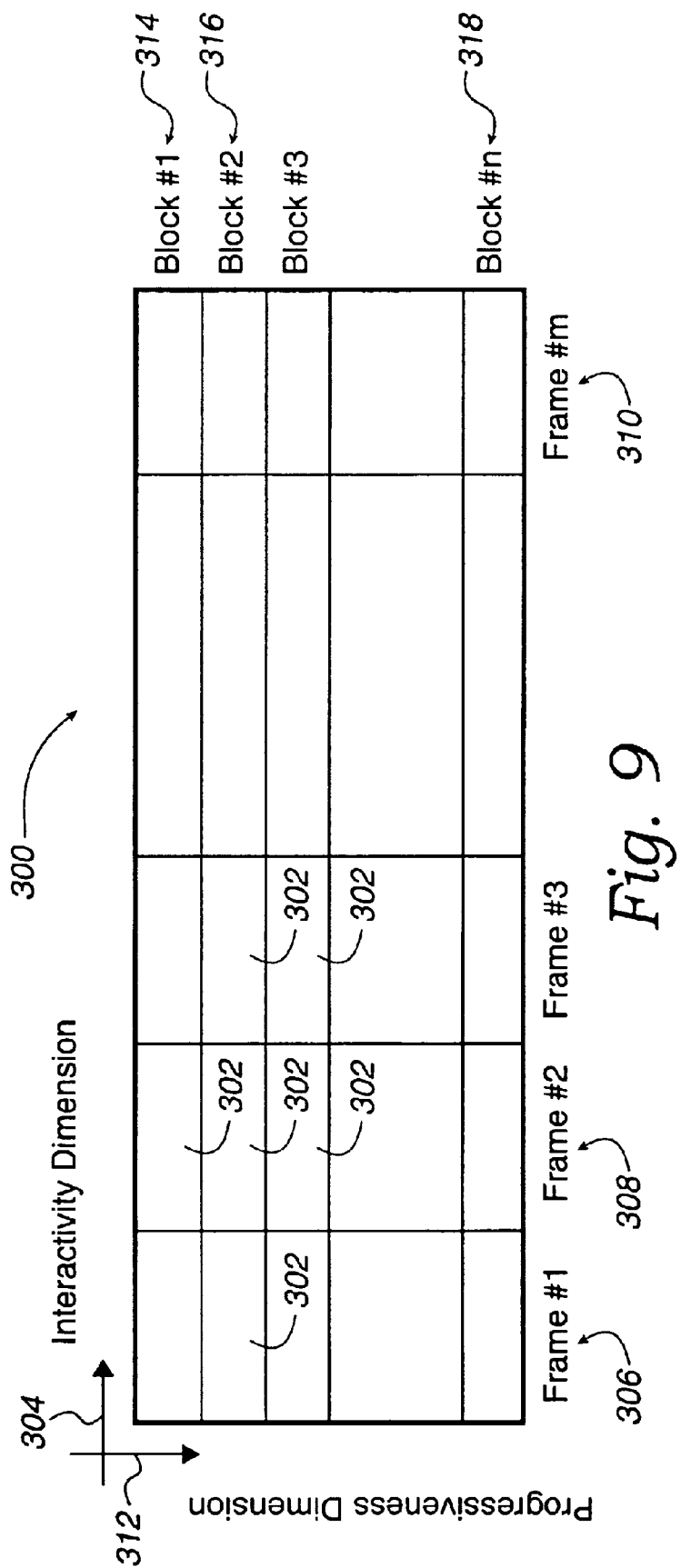
FIG. 9 shows a database of multimedia data.

Reference is now made to FIG. 9, which appears in the above referenced U. S. Patent Application. FIG. 9 illustrates a two-dimensional database 300 of interactive video or other interactive multimedia data. Each rectangular entry 302 of the database includes partial data for a frame. The horizontal axis 304 of the two-dimensional database represents an interactivity dimension; i.e., it represents the way a user advances through the database when he interacts with the multimedia. For video, the interactivity dimension relates to frames, since user interactivity manifests itself in advancement through frames. Thus the leftmost column of data 306 in FIG. 9 represents the data for Frame #1, the second from left column 308 represents the data for Frame #2, and the rightmost column 310 represents the data for the last frame, Frame #m.

The vertical axis 312 of the two-dimensional database represents a progressive dimension; i.e., the quality of the multimedia. Thus the topmost row 314 represents data from a first block, which is a first, low quality, level of multimedia. The second from top row 316 represents enhancement data, which, when used in conjunction with data from the first block, provides a second, higher quality level of multimedia. The bottom row 318 represents enhancement data which, when used in conjunction with the preceding blocks, provides an $n^{th}$, highest quality level of multimedia. It is noted that Block #1 contains the first quality level of multimedia data for all of the frames, 1 through m, and Block #2 contains the enhancement data for achieving the second quality level of multimedia (when combined with data from Block #1) for all of the frames, 1 through m.

Figure 10:
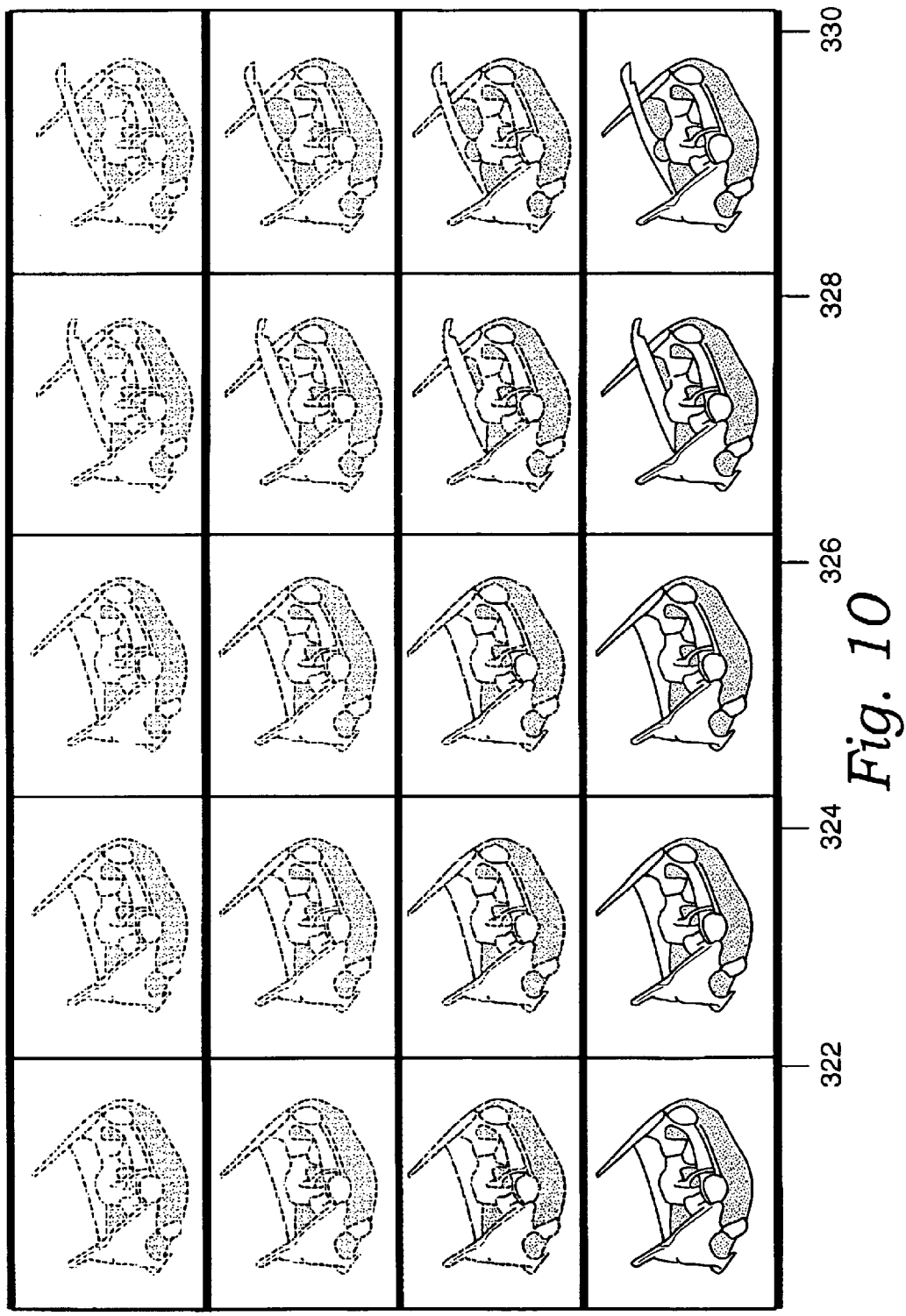
FIG. 10 shows an example of data in four blocks.

Reference is now made to FIG. 10, which also appears in the above referenced U. S. Patent Application, and which includes five frames 322, 324, 326, 328 and 330 of a movie showing a sequence in which the hood of a car is raised and the engine underneath the hood is revealed. The data is partitioned into four blocks and the five frames of each block are shown in four progressive rows. The top row 332 of frames is the first block. The frames of this block are blurred, and have the lowest quality. The bottom row 334 of frames is sharp, and has the highest quality. Successive blocks are accumulated in each row of frames, and the quality improves in each successive row from top to bottom. Thus, the second from top row 336 displays the frames obtained by combining data in Blocks 1 and 2. The second block is the incremental data used in advancing from the first row of frames to the second row of frames. Similarly, the third from top 338 row displays the frames obtained by combining data in blocks 1–3, and the third block is the incremental data used in advancing from the second row of frames to the third row of frames. Similarly, the bottommost row 334 displays the frames obtained by combining the data in Blocks 1–4, and the fourth block is the incremental data used in advancing from the third row of frames to the fourth row of frames.

The term "slices" is used interchangeably with "blocks" throughout the present specification.

Figure 5:
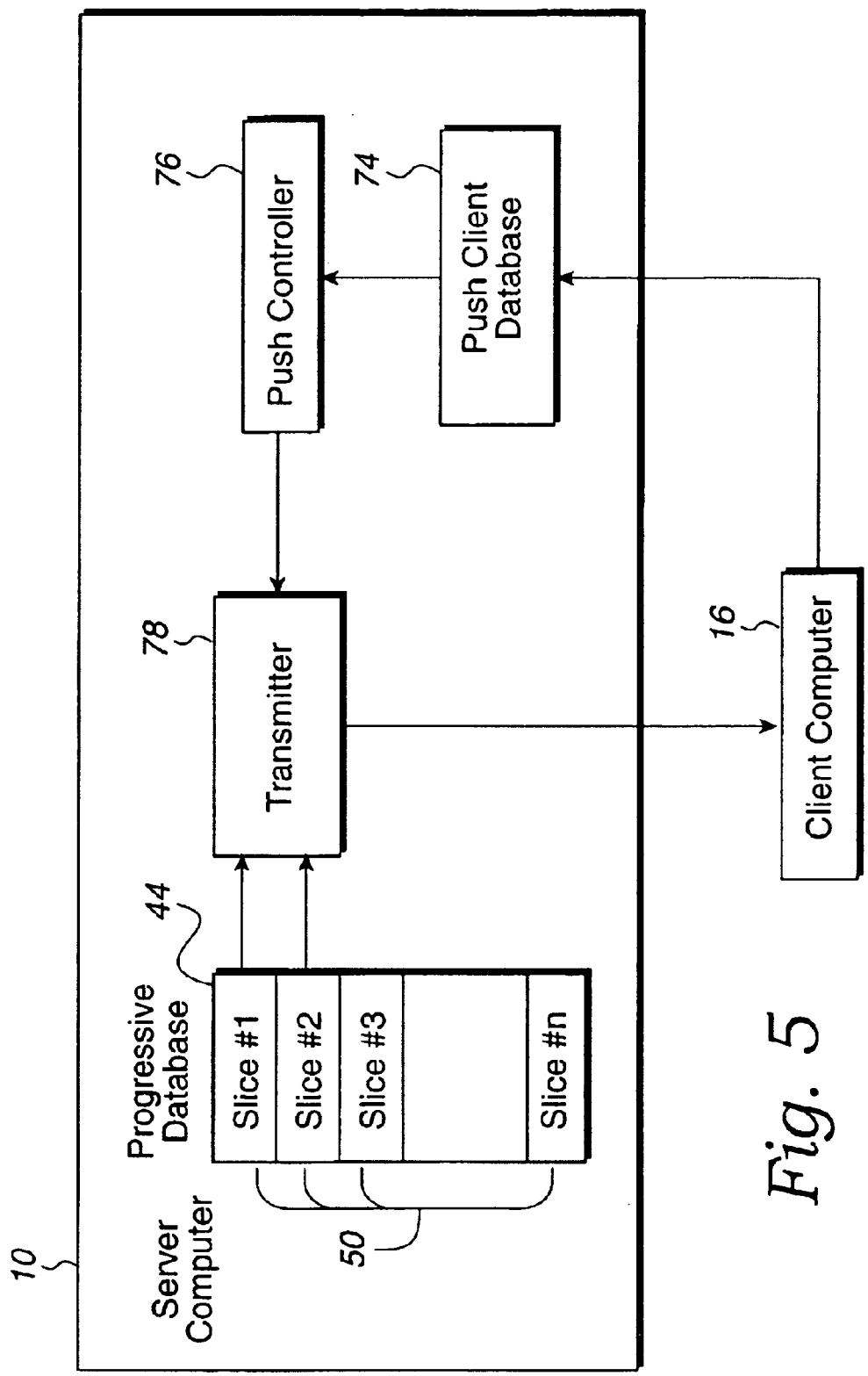
FIG. 5 is a functional block diagram of a transmitting portion of the system of FIG. 4.

Reference is now made to FIG. 5, which is a functional block diagram of a transmitting portion of the system of FIG. 4. A server computer 10 maintains progressive database 44 for digital files, such as multimedia files, partitioned into slices 50 labeled Slice #1, Slice #2, . . . , Slice #n. The server computer 10 maintains a push client database 74 which contains the identities of the subscribers and their preferences. Database 74 is built up in response to requests from client computers 16. A push controller 76 queries database 74 and determines how many slices 50 of the multimedia are to be pushed to each subscriber.

If delivery of the data is to be done on-line, then controller 76 also checks whether or not the subscriber is on-line. If delivery is to be done off-line, such as through the use of electronic mail, then no such check is necessary. When delivery is to be made, controller 76 instructs transmitter 78 to send the appropriate slices 50. Illustrated in FIG. 5 is a scenario where the transmitter is instructed to send the first two slices, Slice #1 and Slice #2.

Figure 6:
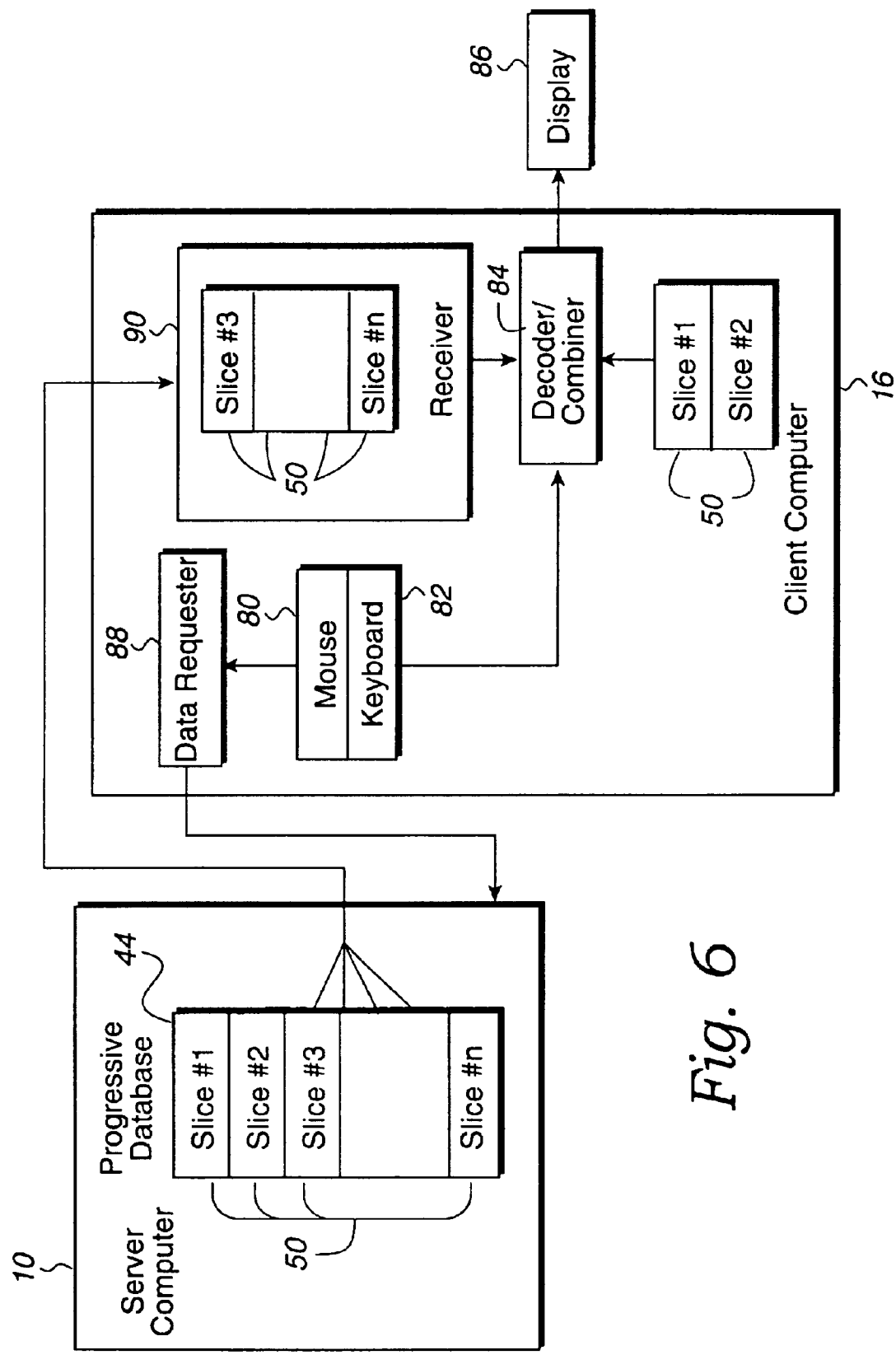
FIG. 6 is a functional block diagram of a receiving portion of the system of FIG. 4.

Reference is now made to FIG. 6, which is a functional block diagram of a receiving portion of the system of FIG. 4. A client computer 16 has been sent Slice #1 and Slice #2 of a digital file, such as a multimedia file from a progressive database 44 within a server computer 10. The client computer 16 either receives these slices when the subscriber is on-line, or fetches them from incoming electronic mail.

The subscriber accesses the multimedia through the use of a mouse 80 or a keyboard 82. When this occurs, two operations are then actuated. The first operation involves a decoder/combiner 84, decoding the slices 50 which are already resident within the local computer, combining them and displaying the combined decoded media on a display 86. Simultaneously, if the client is on-line, the second operation involves a data requester 88, which issues an instruction to server 10 for additional slices to be delivered. Server 10 then transmits the remaining slices, Slice #3, ..., Slice #n, to a client receiver 90. In turn, as the slices arrive, receiver 90 delivers them to decoder/combiner 84, in order to render enhanced versions of the media.

Figure 7A:
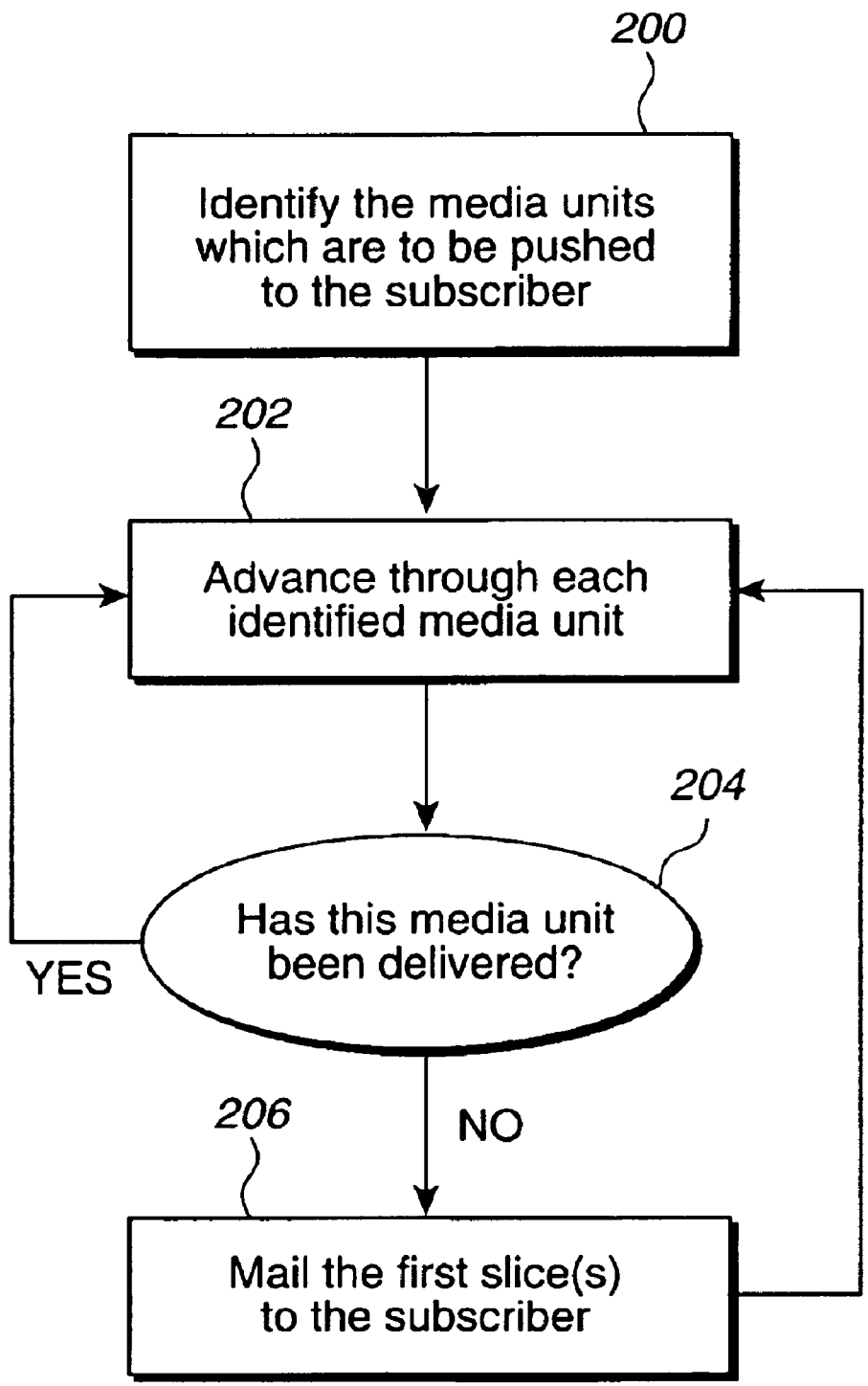
FIGS. 7A and 7B are simplified flowcharts of a transmitting portion of the system of FIG. 4.
Figure 7B:
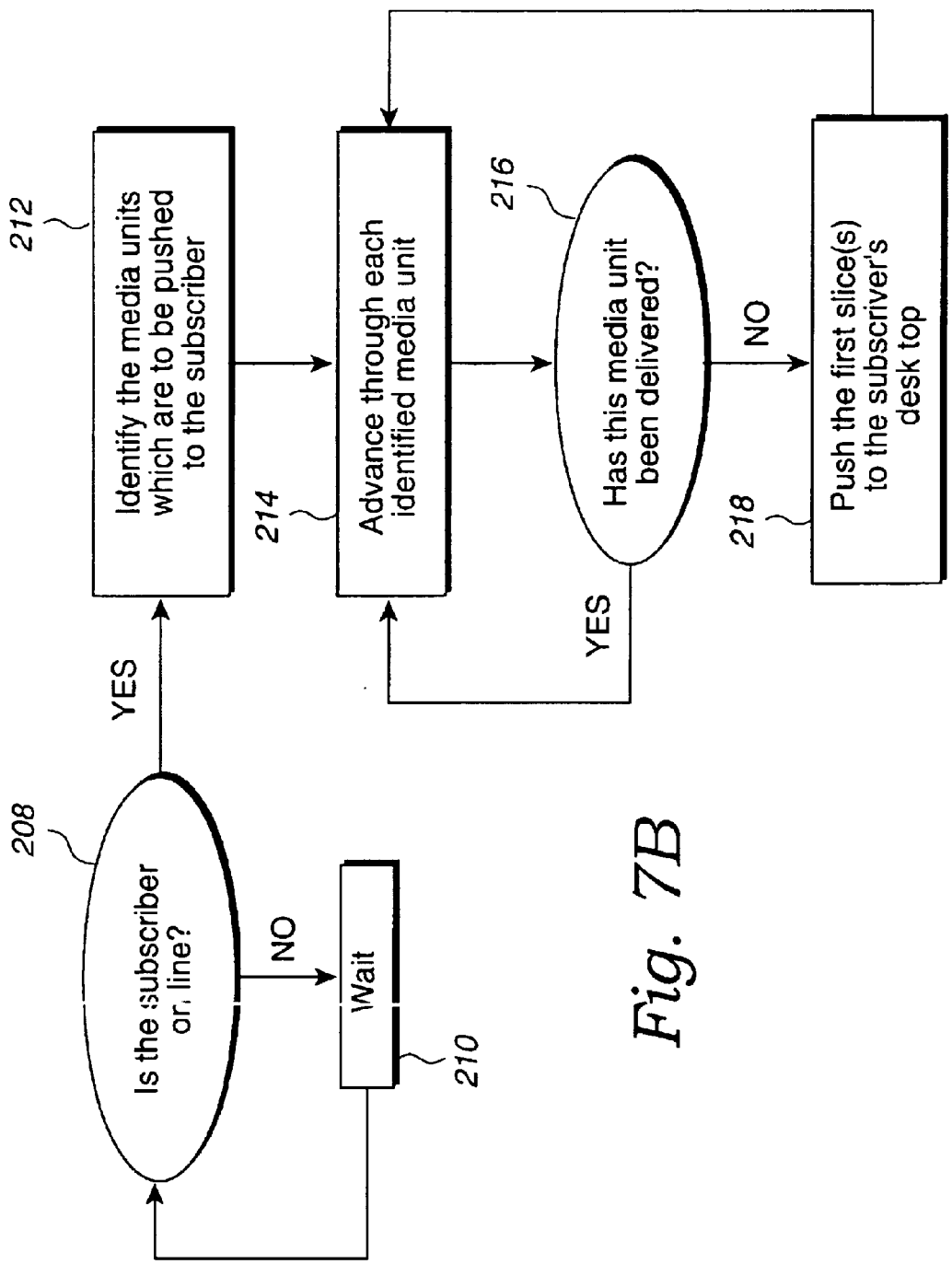

Reference is now made to FIGS. 7A and 7B, which are simplified flowcharts of a transmitting portion of the system of FIG. 4. There are illustrated two modes of pushing media to subscribers. The first mode is an off-line mode, depicted in FIG. 7A, and involves the use of electronic mail to send the media. The second mode is an on-line mode, depicted in FIG. 7B, and involves on-line transmission. At step 200 the server identifies which media units are to be delivered to a given subscriber. At step 202 the server loops through each of the media units which are identified, the loop entailing determining at step 204 whether or not the media unit has already been delivered, and, if not, mailing it to the subscriber at step 206. Only the first slice or slices of the media are mailed—which suffice to enable the user to view the media at low quality.

In the on-line mode, at step 208 the server first checks if the subscriber is on-line. If not, it waits at step 210 and re-checks later. When it finds the subscriber on-line, it identifies the media units that are to be delivered at step 212. At step 214 the server loops through each of the media units which are identified, the loop entailing determining at step 216 whether or not the media unit has already been delivered, and, if not, transmitting it to the subscriber at step 218. Only the first slice or slices of the media are mailed—which suffice to enable the user to view the media at low quality.

Figure 8:
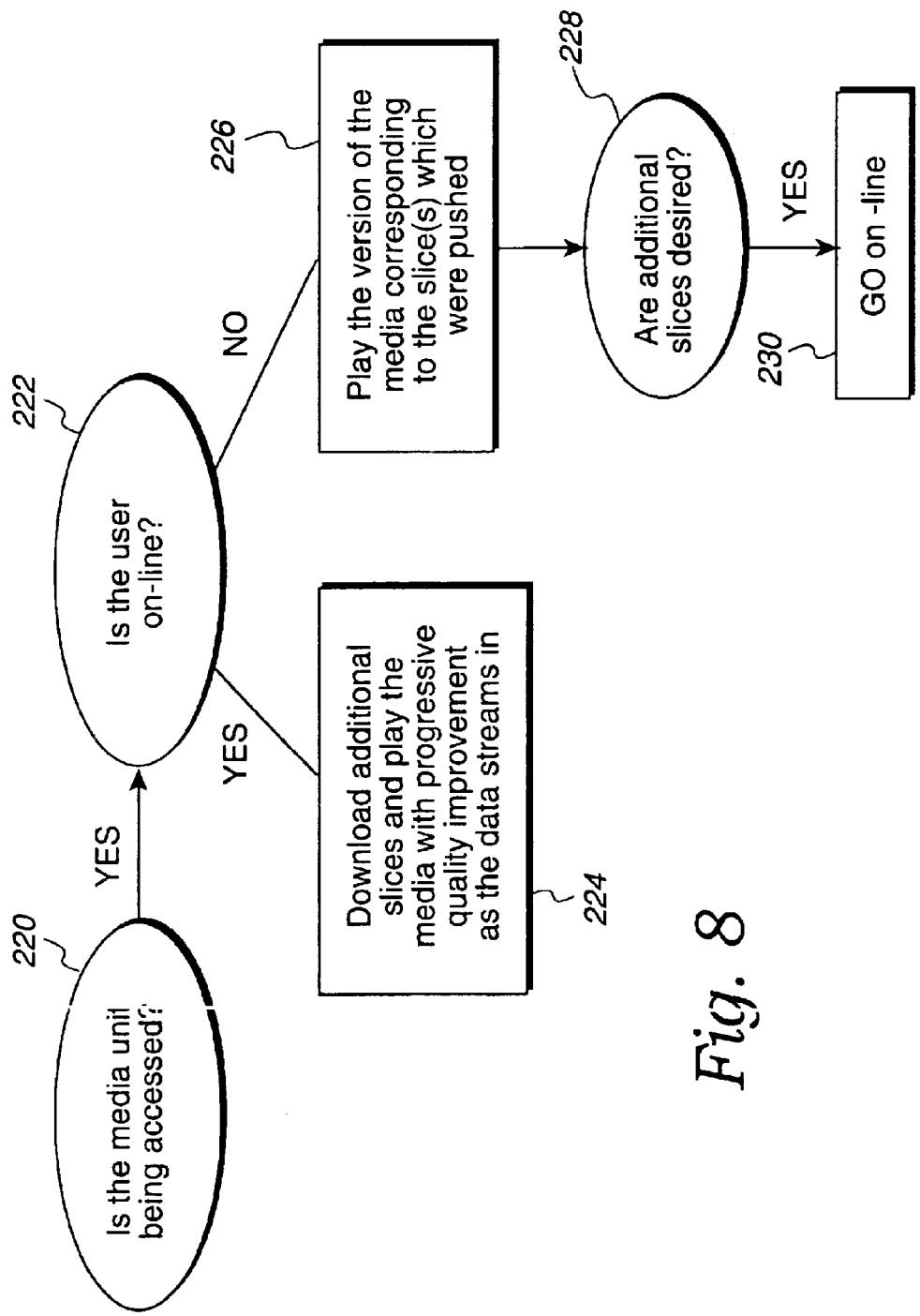
FIG. 8 is a simplified flowchart of a receiving portion of the system of FIG. 4.

Reference is now made to FIG. 8, which is a simplified flowchart illustrating operation of a receiving portion of the system of FIG. 4. At step 220, the client computer recognizes that the media unit is being accessed by the user. At step 222, the client computer checks whether it is on-line. In case of transmission through electronic mail, as illustrated in FIG. 7A, the client is necessarily on-line when the mail is received.

If the client is on-line when accessing the media, then additional slices are automatically streamed in background, and the media is played at step 224 with progressive quality improvement as the data streams in. If the client is not on-line when accessing the media, then only those slices that were pushed are used to play the media, resulting in less than highest quality. The user has the option of actuating media pull by going on-line to receive additional slices at steps 228 and 230.

It will be appreciated by persons skilled in the art that the present invention is not limited by what has been particularly shown and described hereinabove. Rather the present invention includes combinations and subcombinations of the various features described and shown hereinabove as well as extensions and variations thereof which would occur to a person of ordinary skill in the art and which are not in the prior art.

What is claimed is:

1. A system for transmitting digital data including a plurality of frames to an active desktop of a user, the system comprising:
   an active desktop of a user with push pull functionality;
   a digital data downloader operative to transmit a first portion of said digital data to said active desktop in a push mode, based on subscriber preferences and without concurrent user actuation, said first portion of said digital data being such as to enable all of the plurality of frames of said digital data to be accessible at at least a minimum quality prior to transmittal of the remainder of said digital data to said active desktop, said digital downloader also being operative in a pull mode in response to user actuation for transmitting at least a second portion of said digital data; and
   a digital data combiner operative to combine said at least a second portion of said digital data with said first portion, so as to provide the user with all of the plurality of frames of said digital data at an enhanced quality as compared with said minimum quality.

2. A system according to claim 1 and wherein said digital data is data for a plurality of images and wherein said first portion of said digital data enables all of the plurality of images to be seen by a user at at least a minimum quality.

3. A system according to claim 1 and wherein said digital data is audio data and wherein said first portion of said digital data enables the entire audio data to be heard by a user at at least a minimum quality.

4. A system according to claim 1 and wherein said digital data downloader is operative to transmit said first portion of said digital data to said active desktop in response to receipt of a signal from said active desktop wherein said signal is generated without concurrent user actuation.

5. A system according to claim 1 and wherein said digital data downloader is operative to transmit said first portion of said digital data to said active desktop in response to an actuation input generated at the digital data downloader.

6. A system according to claim 1 and wherein said digital data downloader is located at a server and is operative to transmit said first portion of said digital data to said active desktop in response to an actuation input generated at said server.

7. A system according to claim 1 and wherein said digital downloader is operative when said active desktop is on-line.

8. A system according to claim 1 and wherein said digital data downloader is operative when said active desktop is off-line.

9. A system according to claim 1 and wherein said digital data downloader is operative when said active desktop is on-line or off-line.

10. A method for receiving digital data including a plurality of frames at an active desktop of a client computer having push pull functionality comprising the operations of:
   receiving a first portion of said digital data transmitted in a push mode to said active desktop without concurrent user actuation, said first portion of said digital data being such as to enable all of the plurality of frames of said digital data to be accessible at at least a minimum quality prior to transmittal of the remainder of said digital data to said active desktop;
   pulling, in response to user actuation, at least a second portion of said digital data; and
   combining at said client computer said first portion and said second portion, thereby providing the user with all of the plurality of frames of said digital data at an enhanced quality as compared with said minimum quality.

11. A system for receiving digital data including a plurality of frames at an active desktop of a client computer having push pull functionality comprising:
  a pushed partial data receiver, receiving a first portion of said digital data transmitted in a push mode to said active desktop without concurrent user actuation, said first portion of said digital data being such as to enable all of the plurality of frames of said digital data to be accessible at at least a minimum quality prior to transmittal of the remainder of said digital data to said active desktop;
  a user actuated partial puller operative to pull, in response to user actuation, at least a second portion of said digital data; and
  a combiner, combining at said client computer said first portion and said second portion, thereby providing the user with all of the plurality of frames of said digital data at an enhanced quality as compared with said active desktop.

12. A system for transmitting digital data including a plurality of frames to an active desktop of a user with push functionality, the system comprising:
  a digital data downloader operative to transmit a portion of said digital data to said active desktop in a push mode, based on subscriber preferences and without concurrent user actuation, said portion of said digital data being such as to enable all of the plurality of frames of said digital data to be accessible to the user at at least a minimum quality prior to transmittal of the remainder of said digital data to said active desktop.

13. A system according to claim 12 and wherein said digital data is image data and wherein said portion of said digital data enables the entire image data to be seen by a user at at least a minimum quality.

14. A system according to claim 12 and wherein said digital data is audio data and wherein said portion of said digital data enables the entire audio data to be heard by a user at at least a minimum quality.

15. A system according to claim 12 and wherein said digital data downloader is operative to transmit said portion of said digital data to said active desktop in response to receipt of a signal from said active desktop wherein said signal is generated without concurrent user actuation.

16. A system according to claim 12 and wherein said digital data downloader is operative to transmit said portion of said digital data to said active desktop in response to an actuation input generated at the digital data downloader.

17. A system according to claim 12 and wherein said digital data downloader is located at a server and is operative to transmit said portion of said digital data to said active desktop in response to an actuation input generated at said server.

18. A system according to claim 12 and wherein said digital data downloader is operative when said active desktop is on-line.

19. A system according to claim 12 and wherein said digital data downloader is operative when said active desktop is off-line.

20. A system according to claim 12 and wherein said digital data downloader is operative when said active desktop is on-line or off-line.

21. A method for transmitting digital data to an active desktop of a client computer with push functionality, comprising the operations of:
  providing digital data for transmission to an active desktop of a user; and
  pushing without concurrent user actuation a portion of said digital data to said active desktop, said portion of said digital data being such as to enable all of said digital data to be accessible at at least a minimum quality prior to transmittal of all said digital data to said active desktop.

22. A method according to claim 21 and wherein said digital data is image data and wherein said portion of said digital data enables the entire image data to be seen by a user at at least a minimum quality.

23. A method according to claim 21 and wherein said digital data is audio data and wherein said potion of said digital data enables the entire audio data to be heard by a user at at least a minimum quality.

24. A method according to claim 21 and wherein said pushing transmits said potion of said digital data to said active desktop in response to receipt of a signal from said active desktop, wherein said signal is generated without concurrent user actuation.

25. A method according to claim 21 and wherein said pushing transmits said portion of said digital data to said active desktop in response to an actuation input generated at the location where said pushing occurs.

26. A method according to claim 21 wherein said pushing occurs at a server and wherein said pushing transmits said portion of said digital data to said active desktop in response to an actuation input generated at said server.

27. A method according to claim 21 and wherein said pushing operation takes place when said active desktop is on-line.

28. A method according to claim 21 and wherein said pushing operation takes place when said active desktop is off-line.

29. A method according to claim 21 and wherein said pushing operation takes place when said active desktop is on-line or off-line.

30. A system for receiving digital data including a plurality of frames at an active desktop of a user with push functionality, the system comprising:
  a pushed partial data receiver, receiving a portion of said digital data transmitted in a push mode to said active desktop without concurrent user actuation, said portion of said digital data being such as to enable all of the plurality of frames of said digital data to be accessible at at least a minimum quality prior to transmittal of the remainder of said digital data to said active desktop.

31. A method for receiving digital data including a plurality of frames at an active desktop of a client computer having push functionality comprising the operation of:
  receiving a portion of said digital data transmitted in a push mode to said active desktop without concurrent user actuation, said portion of said digital data being such as to enable all of the plurality of frames of said digital data to be accessible at at least a minimum quality prior to transmittal of the remainder of said digital data to said active desktop.

* * * * *